June 17, 1930.  R. FLEMING  1,764,296
METHOD AND APPARATUS FOR TREATING HYDROCARBONS
Filed Oct. 29, 1923  7 Sheets-Sheet 3

June 17, 1930.  R. FLEMING  1,764,296
METHOD AND APPARATUS FOR TREATING HYDROCARBONS
Filed Oct. 29, 1923  7 Sheets-Sheet 5

INVENTOR
Richard Fleming.
BY
ATTORNEY

Patented June 17, 1930

1,764,296

UNITED STATES PATENT OFFICE

RICHARD FLEMING, OF PLAINFIELD, NEW JERSEY

METHOD AND APPARATUS FOR TREATING HYDROCARBONS

Application filed October 29, 1923. Serial No. 671,277.

This invention relates to the method and apparatus for treating oil, and has particular reference to improvements in both method and apparatus whereby different oils may be treated in the same apparatus by processes varying according to the nature of the oil and the product or products desired to be produced.

At the present time, outside of a relatively few large refineries, the custom is largely to specialize in apparatus for definite processes such as topping, atmospheric distillation or fractionation, conversion, steam stilling, etc., a particular raw material being employed in each of these general apparatuses and a particular desired end product being turned out. Thus, for example, there are many small topping plants in the country which take off the natural gasoline and some of the kerosene from crude oil, and sell the residue as fuel or gas oil, distillate, etc. Other plants buy such oils from the topping plants and convert them into lighter fractions, sometimes re-treating the residues but more generally selling the same as road oil, heavy fuel oil, pitch, etc. A few large plants produce all the desired end products in separate apparatus.

The foregoing organization of the oil refining industry necessarily results in heavy expense for plant investment, maintenance, and depreciation because of the large amount of apparatus and labor required; and also is uneconomical because of heat losses in the various steps required to convert crude oil into constituents such as naphtha, gasoline, kerosene, light and heavy gas oil, light and heavy fuel oil, pitch, etc. Not only are there heat and operating losses but there is also an increased overhead because of fluctuations in supplies and prices of raw materials and demand and prices for finished products, so that a large investment in tank storage for different products is required by most large refineries in order to attain some measure of economical operation. Owing to these and other diverse factors, the investment in plant and storage for completely treating crude oil is constantly increasing out of proportion to the savings effected, but is necessitated by the present too highly specialized conditions in the manufacturing portion of the oil business.

It is the object of this invention to effect still further economies in both plant investment and operating efficiency in either large or small plants by providing the method and apparatus of this invention whereby any or several raw materials ranging for example from crude oil to heavy fuel oil, can be treated in one plant so as to economically recover all of the desired end products. Such a plant has the further advantage of being independent of a particular raw material, but can be operated on any one of several, according to which is most readily obtainable in the market at the time. Also, if one raw material is not available, another may be used, which dispenses with a considerable amount of tank storage capacity now required to be maintained even by small refiners, but still enables end products of standard quality to be produced.

According to this invention in a single plant crude oil may be topped; the residue therefrom not containing light fractions treated by conversion so as to produce additional light fractions; and the residue from conversion treated to produce other fractions capable of being re-worked in the conversion apparatus and finally a heavy residue or pitch incapable of being further treated economically. Provisions are made for recovering the desired end products at the proper stages and discharging the residues for the treatment in the succeeding stage. A single such plant can thus be used for treating crude oil, gas oil, kerosene, light or heavy fuel or gas oil distillate, pitch, tar, for steam stilling, etc., with retreatment of intermediate products, simply by changing valves and temperatures to vary the operating conditions. Deposits of coke on interior surfaces are eliminated in part by a novel method of heating and in part by permitting the deposition of the coke which is freed during conversion to occur at points in the system where it can easily be controlled or removed.

The process in this invention comprises raising the temperature of the material to be treated to about 800° F., more or less, under such pressure as to prevent vaporization or conversion, then effecting a partial conversion by reducing the pressure to such an extent as to release converted and unconverted vapors, while leaving some of the saturated hydrocarbons still in liquid form as a protection mixed with any asphaltic residues which may be present, whereby release and deposition of carbon is prevented. This does not mean that saturated hydrocarbons remain in liquid form in preference to unsaturated hydrocarbons, but does mean that the asphaltic residues, generally unsaturated, are the principal cause of carbon formation, and by keeping the fractions in liquid form which have boiling points at or below those of these residues vaporization of the residues and decomposition into carbon is avoided. This mixture is drawn off and the saturated oil fractions are separated from the asphaltic residues by vaporization of the former on further reduction in pressure and preferably by intermixture with steam. The wide range of products first vaporized, including the major portion, is meanwhile passed through a fractionating tower or towers supplied with fresh oil and maintained under regulated temperature such that the light fraction vapors from the heated vaporized oil first treated and such light fractions in the fresh feed pass together to a condenser. The heavy ends from the fresh feed and the heavy condensate from the heated vapors are recycled through the heating and pressure reducing stage to produce additional light fractions. The residues from the final expansion stage are drawn off for any desired use.

This invention will be more fully understood in connection with the description of the accompanying drawing wherein.

Figure 7:
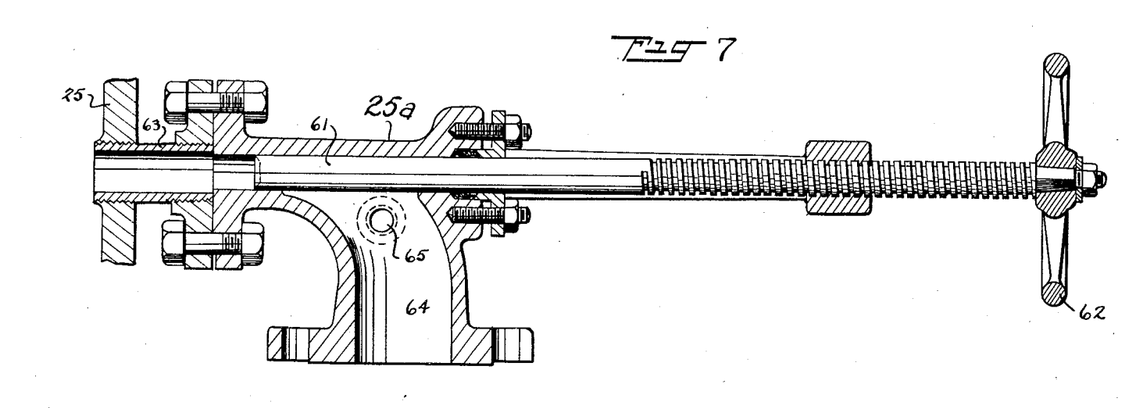
Figure 7 shows the reducing vale 25ª between the separating chamber 25 and the line 27.

The supply line 10 passes the material to be treated through the pump 11, pipe 12, into the top of the dephlegmator 13. The heated vapors enter the dephlegmator near the bottom through the line 14 and the pressure distillate leaves through the pipe 15 whence it is conducted to the condenser 16, illustrated as being of the jet type. From the bottom of the dephlegmator a pipe 17 leads through the pump 18, line 19, into the pipe coil heater 20 within the furnace wall 21 heated by one or more flame nozzles 22 located above the heater. A reducing valve 23 is located outside the furnace wall and the outlet 24 from the heater leads through the check valve 26, located below the liquid level in the separating chamber 25. From this chamber the vapor line 14 leads into the dephlegmator while from the lower portion of said chamber are arranged one or more reducing valves 25ª through which the liquid material is then passed through the line 27 into the expansion chamber 28. These reducing valves 25ª are operable one at a time, several being provided in case one should become clogged with carbon or other impurities. A steam line 29 leads into the side of each reducing valve 25ª in the line 27, as shown in Figure 7 at 65, and it will be understood that the steam is preferably not injected beyond the valve, as suggested in Figures 1, 2 and 3, but rather at the valve where the reduction in pressure takes place, as shown in Figure 7. From the expansion chamber the vapor line 30 leads the vaporized heavier oil fractions through the condenser 31 and line 32 to suitable tanks. The heavy liquid residue is drawn off from the expansion chamber, passed through the cooling box 33 and out the line 34, for storage. Under some conditions a valve 36 may be opened to allow part of the liquid from the bottom of the dephlegmator to be passed through the cooling box 35 and thence through the pump 37 into the feed line 12. Some or all of the heavy fractions from the line 32 may be returned through the pipe 38 to the pump 39 and passed into the supply line 12. Under some conditions it may be desirable to heat the feed passing through the line 12 when part or all thereof may be passed through the pipes 40 and 42 into the heat exchanger 41, where its temperature is raised by the heat in the pressure distillate passing through the pipe 15. All or any part of the pressure distillate may be by-passed around the heat exchanger 41 by means of the pipe 46, and the use of appropriate valves to control the desired direction and proportions of flow are indicated. After passing the heat exchanger 41 and giving up some of its heat the pressure distillate is caused to pass through the separator 43, where the liquid or heavier portions thereof are drawn off through the pipe 44 and the lighter vaporized fractions pass through the pipe 45 into the jet 16. Within the lower part of the furnace may be arranged coils 51 which may be used instead of the heat exchanger 41, if desired, for preheating the feed, or similar coils 51 may also be used for superheating the steam in the line 29. Connecting the bottom of the separating chamber 25 with the line 17 is the pipe 47. Safety valves 68 and 69 are arranged as indicated.

Figure 6:
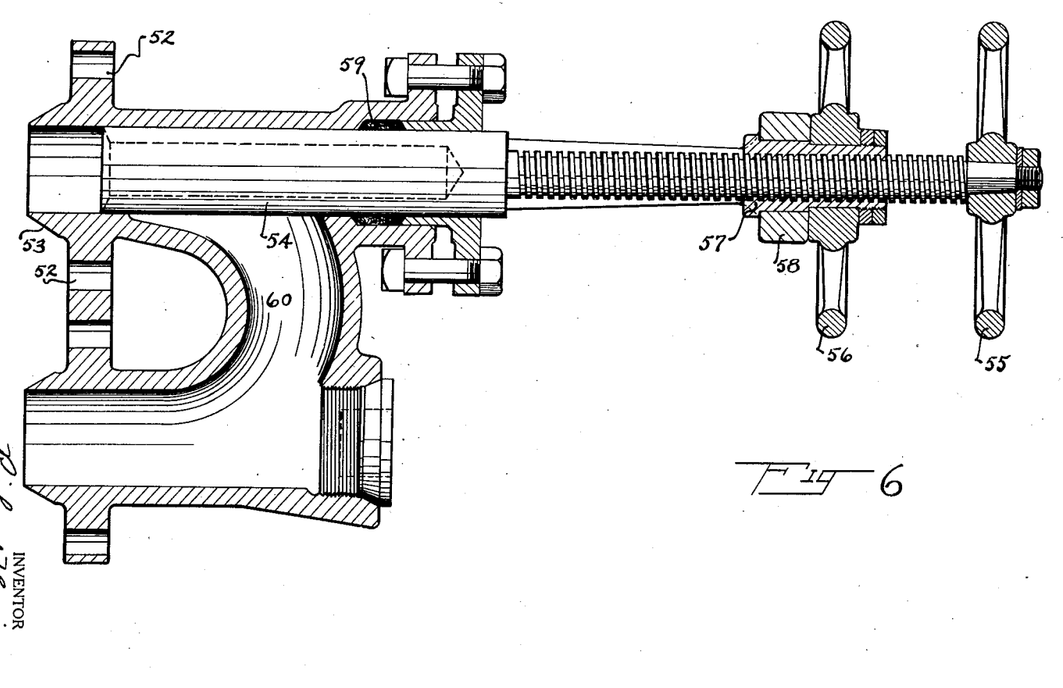
Figure 6 is a detail of the reducing valve 23.

Figure 6 illustrates a preferred form of reducing valve 23 wherein its passageway is connected to the high pressure line by means of bolts passing through the holes 52. The bevelled portion 53 is adapted to fit in a complementary bevelled part of the high pressure line and the bevel on the reducing valve is slightly less than that on the other part so that when the bolts are tightened the valve structure may be firmly wedged in place and securely held without the need of any packing. The valve 54 is controlled from the threaded stem indicated and may either be rotated by moving the hand wheel 55, or on moving the hand wheel 56 and turning the movable nut 57 co-operating with the stationary part 58, the valve may be moved without rotation. Packing is found desirable in the gland 59. The passageway 60 is devoid of any sharp bends and is tapering, becoming narrow as it approaches the end of the valve 54 in the position shown. By adjusting the valve 54 to regulate the size of opening and the pressure drop, this valve may be controlled as desired.

Figure 1:
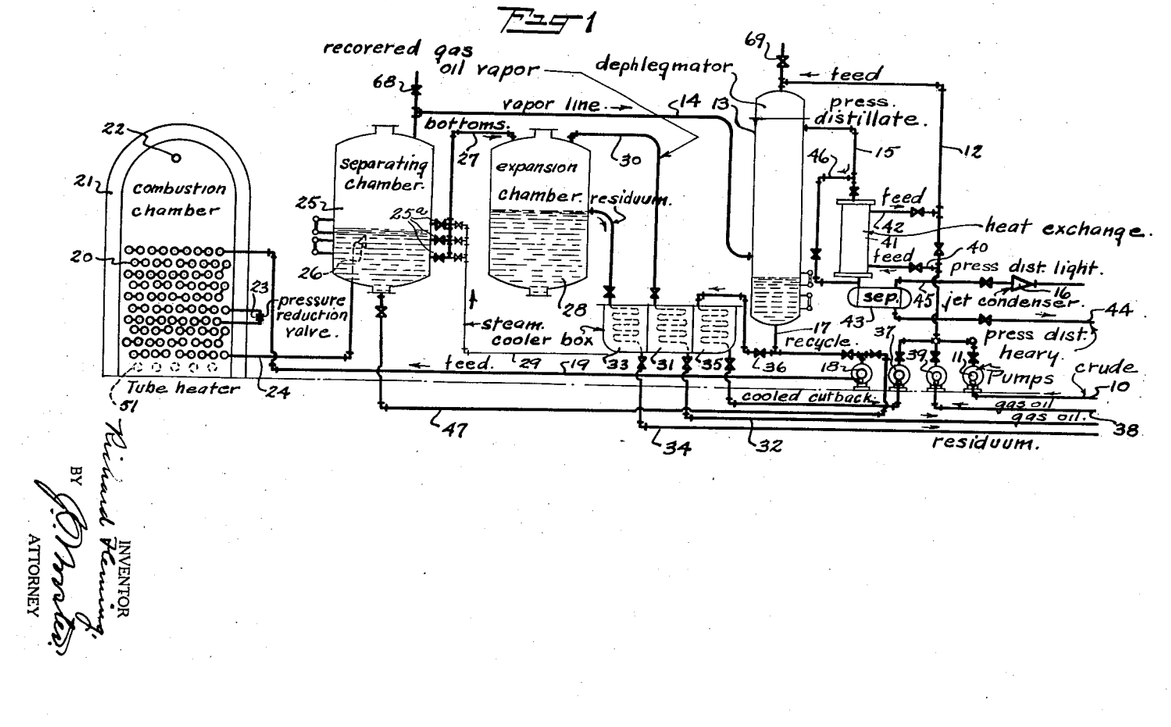
Figure 1 is a representation of the apparatus of this invention.
Figure 2:
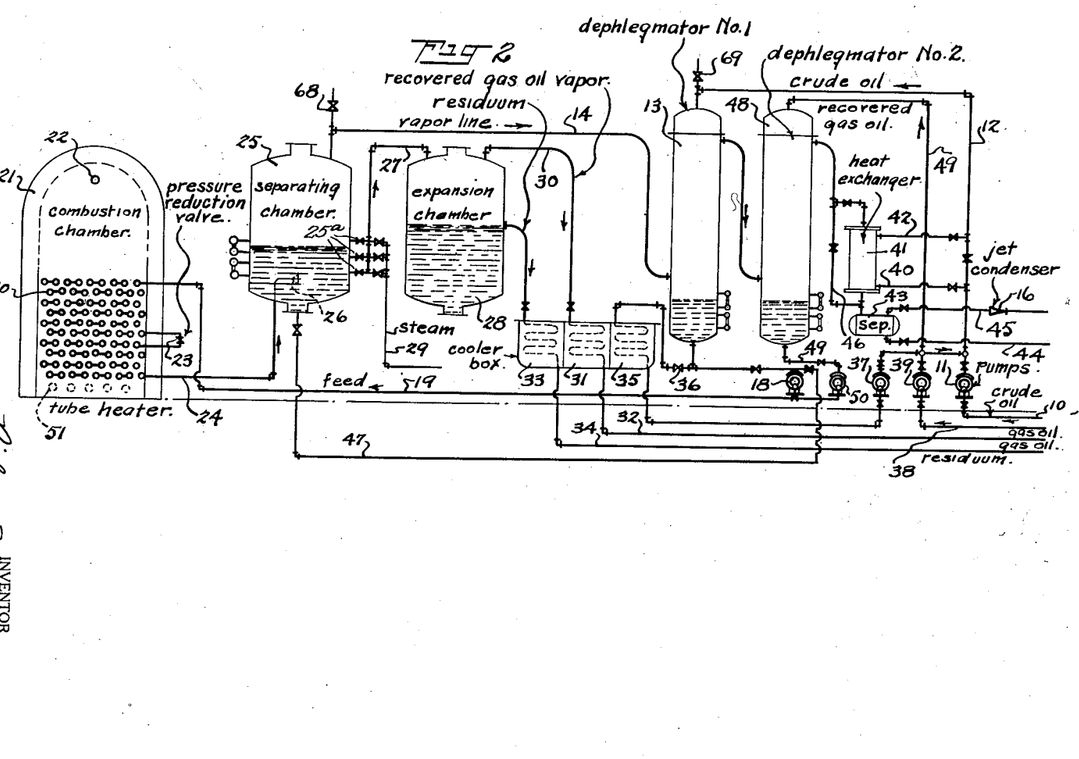
Figure 2 is a view similar to Figure 1 but showing in addition a second dephlegmator.
Figure 3:
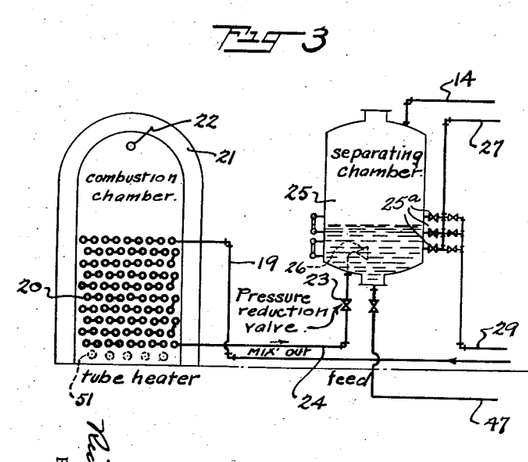
Figure 3 is a modification of the invention shown in Figure 1.

Figure 7 shows the second reducing valve 25ª secured to the side of the separating chamber 25 by means of the bushing 63 which is preferably of a little larger diameter than the valve stem 61 so that by movement of the hand wheel 62, the valve stem may be pushed entirely through the bushing 63 to keep this passageway clean and free from any materials which may collect therein. Moving the valve stem 61 a little further to the right than is its position indicated, the pressure drop may be controlled as desired in the passageway 64, which is connected to the line 27 and leads to the expansion chamber. The steam line 29 shown in Figures 1, 2 and 3 is attached to the valve and the steam enters the opening 65 in one side of the valve at substantially right angles to the flow of materials in the valve and the steam is therefore intimately mixed at substantially the place where the reduction in pressure occurs.

Figure 8:
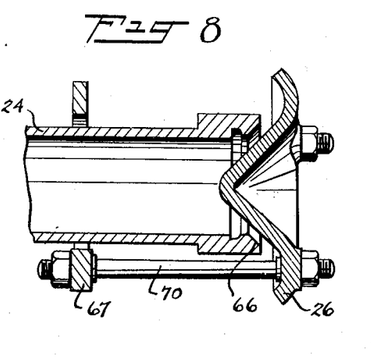
Figure 8 is a detail of the check valve 26.

Figure 8 illustrates one embodiment of the check valve 26 which is located below the liquid level in the separating chamber 25, and is preferably arranged at one side so as to create a circulation of the liquid within this chamber. The check valve 26, when closed, rests upon the seat 66 formed upon the end of the pipe 24. The valve 26 may be curved as illustrated for creating the desired circulation. No springs are provided on this valve and it opens and closes in response to a difference in pressure inside the pipe 24 and chamber 25. For the purpose of guiding the valve 26 in its opening movement, the ring 67 loosely encircles the pipe 24 and three or more bolts 70 secure the ring and valve together. The enlarged end of the pipe 24 prevents the ring 67 coming off the end of the pipe.

Figure 9:
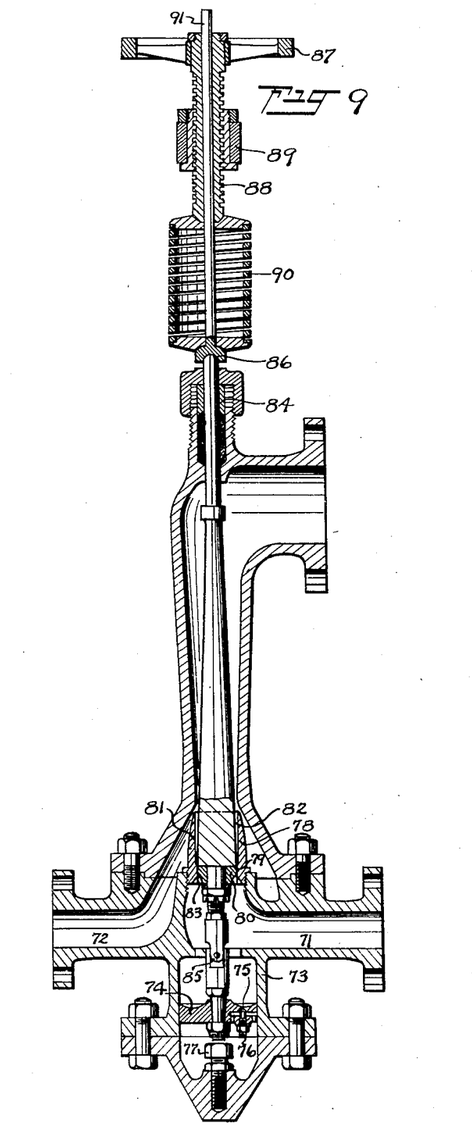
Figure 9 is a section of the automatic valve and condenser.
Figure 10:
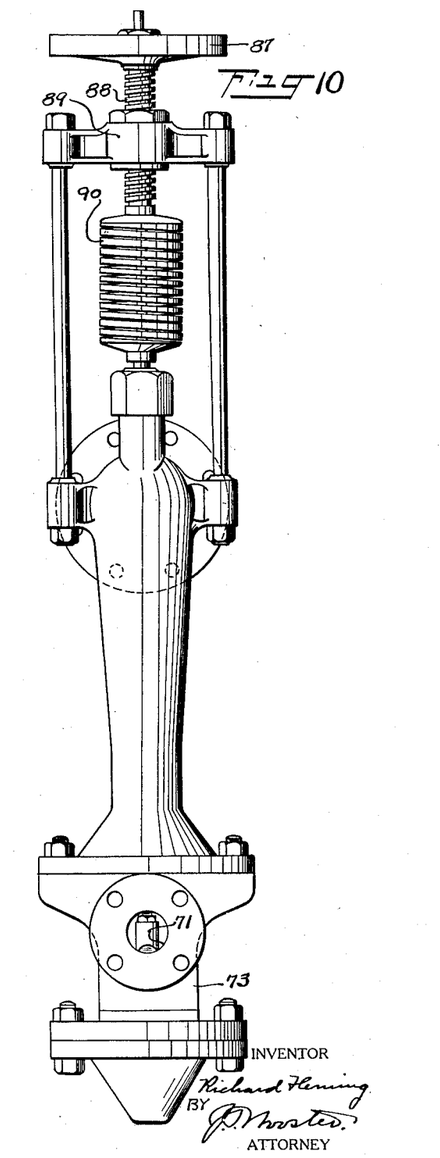
Figure 10 is an outside view of the device shown in Figure 9.

Figures 9 and 10 show the improved automatic valve and condenser which is preferably used in this invention. The passageway 71 is connected to the vapor line 45, while water is supplied to the passageway 72. The valve casing is preferably a steel casting provided at one end with a cylinder 73 having therein a piston 74 with a small opening 75 therethrough for the purpose of providing a dash-pot action to prevent chattering in the valve stem. The threaded stem 76 controls the size of opening 75 so that adjustment of the stem 76 regulates the amount of dash-pot action and cushioning Instead of the hole through the piston as shown, any other form of by-pass around the piston could be provided. Within the end of the cylinder 73 is the adjustable stop member 77 adapted to limit the motion of the valve stem in one direction. Threaded onto the casing is a bushing 78′ of Monel metal or other non-corrosive material provided with a reduced portion 79 in which the valve 80 seats to close and hold the vapor pressure. From the construction illustrated, it will be apparent that the part 80 and part 78 are removable to be easily renewed. The valve 80 is preferably of the same material as bushing 78 and is provided with a plurality of radial ribs 83 at one end thereof so that when the valve is moved to the left in the figure shown, and open, the ribs 83 are still seated in the member 78 to hold the valve accurately in position. The inside of the portion 81 of the bushing is of uniform inside diameter while the valve stem tapers at 82 and the vapors passing between the stem and bushing are therefore given a slightly increasing velocity until reaching the end of the bushing where they become mixed with the water. At the other end of the casing is the bearing and stuffing box 84. In closed position with the valve seated the stem has two bearings, one at the stuffing box 84 and the other at the valve 80. Therefore, to avoid any troublesome difficulties incident to aligning three bearings or aligning the piston 74 a universal joint 85 is provided between the piston 74 and the valve 80. For the same purpose a socket joint 86 is provided beyond the stuffing box 84. Rotation of the wheel 87 moves the screw 88 through the stationary nut 89 and controls the compression of the spring 90 cooperating with the screw 88 at one end and with the enlarged end of the stem 91 on the other. The stem 91 extends out through the screw 88 and hand wheel 87 so that placing the hand on the stem 91 affords an indication of the action of the valve 80 since any chattering or vibration of the valve is transmitted to the stem 91. An automatic valve of the type disclosed which will reduce the opening on lowering of pressure is effective to help maintain the still pressure more uniform. Better operating conditions are attained in a decomposing still when the pressure is maintained substantially uniform since the material in the still is not then required to give up a quantity of the heat of the liquid on the reduction of pressure and necessitating the addition of so much more heat to raise the pressure, but conserves the heat for efficient operation.

Figure 11:
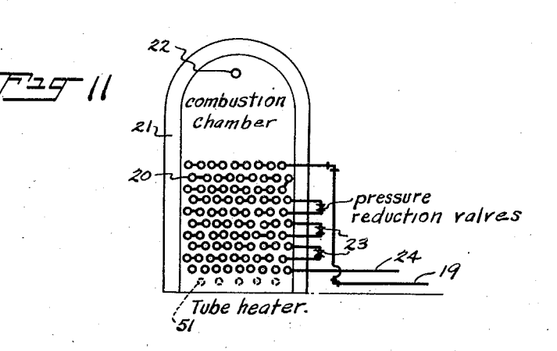
Figure 11 shows a modified arrangement of the reducing valve on the heater.

Figure 11 shows a modification in which several reducing valves are arranged on the heater, any one or more of which may be used at the same time. By making the pressure reduction in more than one instead of a single step in the heater, the maximum temperature of the oil need not be so high as the products may be superheated after reduction in pressure.

Since this invention is particularly adapted for treatment of a crude oil rich in gasoline, its operation with such material as a feed is described although the invention is not limited to this material but may be used with a wide variety of materials. The untopped crude oil is supplied through the pipe 10 and fed by the pump 11 under sufficient pressure to enter the dephlegmator 13 where it comes in contact with the heated vapors which are supplied at a temperature of about 750° F. This temperature is not high enough to decompose the light natural fractions in the feed but is sufficiently high to vaporize these light natural fractions. The heat of vaporization of the light fractions fed in is of an amount to be effective in condensing a large portion of the heavier fractions in the still vapors which are to be separated in the dephlegmator. The use of a temperature lower than that which would decompose the light natural fractions is not the only factor particularly adapting the processes of this invention for the treatment of crude rich in gasoline. Since the dephlegmator in this invention has the heavy duty imposed upon it of knocking back two or three times the customary quantity of heavier fractions in the still vapors, the large amount of heat in the vapors of the heavier fractions to be condensed is partially counterbalanced by the heat which must be absorbed to vaporize the light fractions in the crude. It is found that if the crude contain more than about a third of gasoline, not enough heat will be absorbed to vaporize all the light natural fractions and it is desirable to pre-heat the feed under such conditions by running it through the heat exchanger 41 to absorb some of the heat from the pressure distillate passing through the pipe 15.

Besides supplying the large amount of heat necessary to vaporize the light natural fractions, the portions of the still vapors condensed in the dephlegmator are useful in dissolving and diluting some of the natural heavy portions in the crude. When normally operating with a feed rich in gasoline, the valve 36 is usually closed and the liquid from the bottom of the dephlegmator taken by the pump 18 and sent through the line 19 into the heater 20 under a pressure of from 200 to 1,000 pounds per square inch depending on the kind of material treated. This pressure should be high enough to retain the material in the liquid phase and prevent the vaporization and decomposition of any portion thereof before passing the reducing valve 23.

A feature of this invention comprises the heating of the material treated in such a way as to form a minimum of permanent gases and substantially no carbon. One factor contributing to this result is the maintenance of the high pressure referred to for keeping the material in the liquid phase where no decomposition nor losses occur. Another feature is the furnace construction whereby the heater is uniformly subjected to flue gases of an even temperature. This is accomplished by locating the flame nozzle 22 above the heating tubes instead of below the same with the result that less local convection and eddy currents are formed and the tubes are more uniformly heated. The top row of tubes in this heater also receives the radiant heat from the flame. The temperature gradient of the furnace gases through the tubes is illustrated by the topmost curve in Figure 5. It is desirable to heat the liquid so as to put as much heat as possible into it without reaching its critical temperature and the formation of vapors. After passing the reducing valve the heat of vaporization of the liquid is released to vaporize a wide range of products and to decompose and form some of the desired light fractions. The dotted line in Figure 5 marked oil temperature indicates how the temperature of the liquid drops after passing the reducing valve due to the absorption of heat in vaporizing the material. With the arrangement shown in Figure 1, the lower rows of tubes are gently heated and the vaporized fractions are gradually superheated and further decomposed. Instead of vaporizing substantially all the fractions possible one object of this invention is to retain in liquid form some of the heavier saturated oil fractions mixed with any natural or synthetic asphaltic residues for the prevention of carbon formation.

Carbon formation is believed to be largely due to decomposition and formation of permanent gases and to the decomposition of the heavy asphaltic residues. For this reason, all possible fractions are not vaporized after passing the reducing valve 23, but a saturated heavy fraction is kept in liquid form mixed with any asphaltic residue for the purpose of protecting and preventing the decomposition of such residues. While these asphaltic residues might decompose at a temperature of 700° F. to 800° F, or about 750° F, to which the vapors are superheated after passing the reducing valve, they will not decompose while in the presence of the protective saturated hydrocarbon liquid since before the asphaltic fractions can decompose the saturated hydrocarbon liquid must be vaporized. This is according to the law that the effective temperature to vaporize a complex mixture such as is here met with is that corresponding to the vapor pressure of the lightest fraction in liquid form or to the vapor pressure of the heaviest fraction already vaporized.

Figure 4:
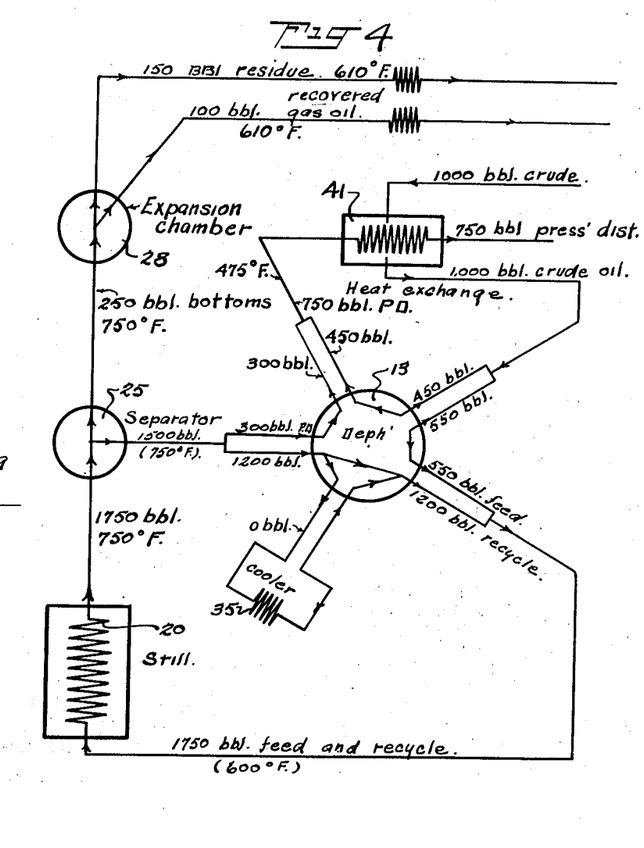
Figure 4 is a flow diagram showing typical proportions and temperatures employed throughout the apparatus.
Figure 5:
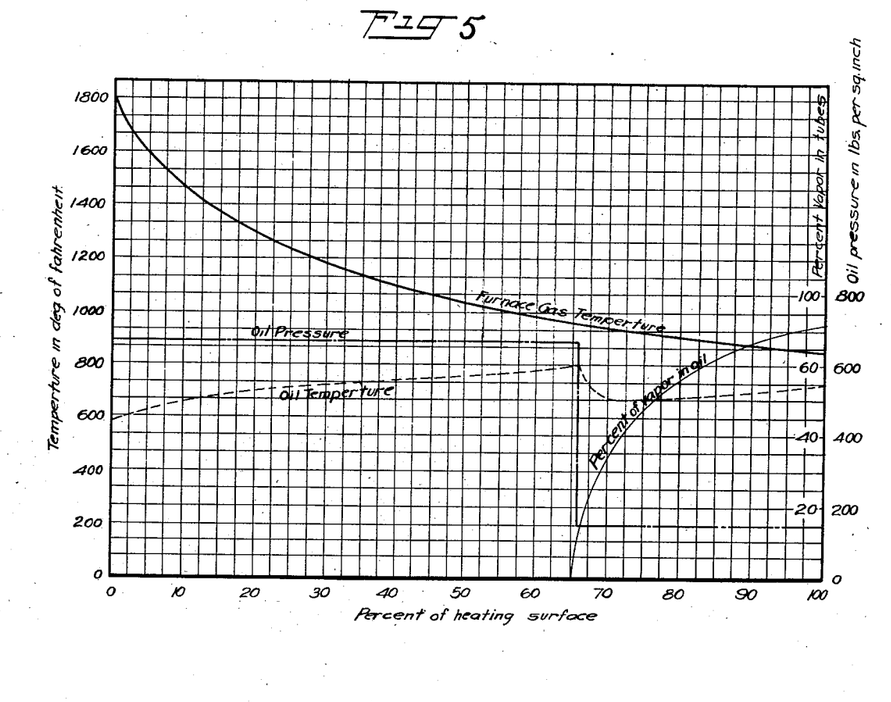
Figure 5 shows a diagrammatical approximation of the furnace temperature, oil pressure and temperature, and percentage of vapor in the oil, throughout the heater in Figure 1.

The curve in Figure 5 indicates the percentage of vapor formed in the oil after passing the reducing valve. If this curve were continued by the further application of heat substantially all the available fractions would be vaporized but that would be objectionable by reason of the larger amount of carbon formed. The heat of the liquid released on passing the reducing valve is principally responsible for the wide range of products vaporized and while the flow diagram of Figure 4 shows that about 85% of the liquid is vaporized in the heater of Figure 1, the protective liquid is nevertheless unvaporized. While such a wide range of products is vaporized the application of heat is so gentle that much less than the maximum possible yield of desired light fractions occurs and the pressure distillate, i. e. vapors reaching the jet are only about ⅓rd to ⅙th of the total material vaporized. By heating the material as in the modification illustrated in Figure 11, a lower temperature may be used. By the statement that the percentage of yield of desirable light fractions is small, is not meant that the total yield of light fractions for a day's run with this invention does not compare favorably with any other existing process, but rather that the yield of light fractions each time the material is passed through the heater is small. Due to the large quantity of knock back being two or three times the customary size, the large amount of recycling necessary will, it should be understood, raise the daily yield of this invention since each time the material is run through the heater more light fractions are formed. After passing the reducing valve the pressure is from 100 to 300 pounds, depending on the kind of materials treated. The highest pressures before reaching the reducing valve are required with those materials containing a substantial quantity of relatively light fractions which would be vaporized but for the heavy pressure. From Figure 5 of the drawing it will be seen that the temperature of the oil is about 800° F. before reaching the reducing valve, and after passing the valve, from about 700° F. to 800° F. preferably 750° F.

While it is desirable to gently superheat the vapors after passing the reducing valve, such is not necessary as the valve may be located as illustrated in Figure 3 where the material, after passing the valve, enters immediately into the separating chamber which may or may not be externally heated.

From the heater, the mixture of liquids and vapors passes into the separating chamber 25 through the check valve 26. The valve 26 is preferably located adjacent a side of the separating chamber below the liquid level so that the mixture of liquid and vapor induces a rotary circulation of the liquid in the chamber 25. The height of the liquid may be determined by means of the gage glasses indicated on the side of the separating chamber. A safety release valve 68 is located to prevent the vapor pressure in the separating chamber becoming excessive.

The liquid in the separating chamber, which comprises a mixture of the protective saturated hydrocarbon and the unsaturated asphaltic residues, is passed through the second reducing valve 25ª into the line 27 and expansion chamber 28. The heat of the liquid on passing the reducing valve is effective to vaporize the saturated hydrocarbon fractions leaving the heavy asphaltic residues in liquid form. Since these residues have lost much of their heat and since the expansion chamber 28 is not heated, there is little danger of carbon being formed. As a means of facilitating vaporization, steam from the line 29 may be injected into the reducing valve 25ª for the purpose of lowering the vaporization point of the mixture. When the steam is introduced at the reducing valve, in the manner shown by Figure 7, there is a more intimate mixture of the steam and oil than is otherwise possible. The vaporized saturated hydrocarbons are led off through the line 30, condenser at 31, outlet 32, and may be led back again through the pipe 38 for mixture with the feed. The asphaltic residues drawn off and passed through the cooler 33 are found to be substantially free from carbon, and because free of such carbon, are adapted for use as fuels where the residues of other processes cannot be used because of the presence of objectionable carbon which would clog the nozzle. Several reducing valves are provided in case one becomes clogged in the line 27.

When the feed comprises a material other than a crude oil rich in gasoline, it will be necessary to open the valve 36 and pass a portion of the liquid from the bottom of the dephlegmator through the cooler 35, pump 37 and into the top of the dephlegmator mixed with the feed. Thus it will be seen that in the absence of a feed containing light fractions having a large heat of vaporization, the thermal efficiency of the apparatus will not be as good for heat must be continually taken out of the condenser 35 in order to enable all the desired large amount of heavy fractions to be knocked back in the dephlegmator 13. The level of liquid in the dephlegmator may be indicated by the gage glass shown on the sides. Another pressure release valve 69 may be located above the dephlegmator.

In starting operation with the apparatus illustrated in Figure 1, the chamber 25 is partially filled, and the vapor discharge line 15 from the dephlegmator closed. The liquid in the chamber 25 is gradually heated by circulating the material through the pipe 47, pump 18, heater 20 and back to the chamber until its temperature is such as to give off the desired vapor pressure. At this time, the feed may be gradually supplied into the top of the dephlegmator and the pressure distillate line 15 opened for continuous operation. The pipe 47 is then closed.

The steam supplied through the line 29 may be superheated by passing through a series of coils 51 in the bottom of the combustion chamber. When dealing with a crude containing more than about a third gasoline and if it is not desired to use the heat exchanger 41 to take some of the heat from the pressure distillate, another series of coils 51 in the base of the combustion chamber may also be used for preheating the feed.

The large amount of knock-back obtained with this invention is substantially independent of the quality of feed. For treating relatively light gravity materials the pump 18 needs to be increased in speed slightly to raise the pressure in the heater in order to prevent vaporization of any of the light fractions which required increased pressure and the valve 23 may require adjusting to keep up the pressure. The material is fed through the heater at a substantially rapid rate to prevent unduly heating any part thereof. By the term "rich crude" is meant one having from about 10% to 50% gasoline. The temperatures indicated on the flow diagram of Figure 4 are typical. The term "gas oil" as used in the flow diagram covers all fractions between kerosene and asphaltic residues and the crude oil used in the illustration of Figure 4 comprises gasoline, 35%; kerosene, 15%; gas oil, 35%; residue, 15%.

Referring to Figure 2 the outlay of apparatus is substantially the same as Figure 1 except that an additional dephlegmator is used, which may share part of the heavy duty imposed upon the single dephlegmator, and which becomes especially desirable when it is intended to remove the kerosene fractions and leave only the gasoline fractions in the pressure distillate. With two dephlegmators the temperature of the vapors entering the second will be around 600° F., more or less, and the vapors leaving the second dephlegmator around 475° F. The material recycled from the first dephlegmator will have a temperature of about 680° F. and that from the second about 575° F. With the liquids from the two dephlegmators at such different temperatures, it is not found desirable to use a single pump and mix the liquids before passing them through the pump for portions of the lighter and cooler liquid might be vaporized and if this happens satisfactory operation of the pump is not obtainable. This is the reason for the use of two pumps 18 and 50, as illustrated in Figure 2.

Among the advantages of this invention may be enumerated the simplification and reduction in plant investment. The adaptability for treatment of a wide variety of products economically and with longer runs and less losses is another noteworthy advantage. A number of factors contribute to the prevention of carbon and excessive permanent gases. Heating in the liquid phase where the requisite heat is put into the material without danger of decomposing, is one such factor. The protective saturated hydrocarbon liquid mixed with any asphaltic residues while they are subjected to temperatures which might cause decomposition is another feature. A further factor is the absence of any local overheating and the more uniform transmission of heat throughout all the tubes resulting from the absence of local eddy currents by having the flame overhead. The heating of the material less than enough to form the maximum yield of desired pressure distillate is another feature tending to reduce the carbon formation. While the yield of light fractions each time the material is passed through the heater is small, because of the large amount of recycling when the knock-back is three to six times the quantity of pressure distillate, the total yield for a longer period of time is high. The separation of the asphaltic residues from the protective liquid under conditions of reduced temperature and pressure where vaporization of one is possible with substantially no carbon formation is a further factor in lessening the losses in this invention.

The use of a moderate temperature, the formation of a small percentage of light fractions, and the large quantity of knock-back make this invention particularly adapted for treatment of crude oil rich in gasoline. If rich crude were fed into the dephlegmator from an ordinary cracking still where the yield of pressure distillate was high, the knock-back relatively small, and the temperature high, some of the light fractions in the crude would be decomposed, while the temperature in some other part of the dephlegmator might fall too low and result in condensation of some of the pressure distillate due to the large amount of heat absorbed by the heat of vaporization of the light fractions in the feed. This invention, because of the absence of carbon formation, is well adapted for the treatment of heavy fractions and the large quantity of knock-back is another feature making the process adapted for treatment of heavy fractions, because the large quantity of materials condensed in the dephlegmator dilute the heavy fractions fed in.

The mixture with steam, when the latter is introduced at the second reducing valve 25ª, is more intimate than if the steam were introduced at some other location, with the result that the desired fractions are vaporized in the expansion chamber at a still lower temperature. The type of reducing valve used between the separating and expansion chambers has the advantage of being self-cleaning.

The automatic condenser valve assists in maintaining the still pressure and therefore insures better operation with less fluctuations in heat supplied and taken from the still. The dash-pot of this valve precludes chatter and there is no excessive tendency for the valve to stay closed as would be the case if it rested on a flat or tapered seat, but since its seat is parallel with its axis the valve is of substantially equal sensitiveness at all times whether closed or open. The sensitiveness of the valve may be ascertained by the operator's hand touching the stem, which projects up through the spring.

By use of the heat exchanger, or preheater 41, the invention is adapted for treatment of a very rich crude.

With this invention, runs of as much as 100 hours or more, are obtainable.

I claim:

1. The method of treating liquid hydrocarbon material to form lighter gravity hydrocarbons which comprises heating the material in the liquid phase to at least the decomposing temperature of some of its fractions and under a high enough pressure to prevent vaporization, reducing the pressure to vaporize the major portion of such material in the presence of a protective liquid having a specific gravity less than that of any asphaltic residues, and forming only a small percentage of the possible light fractions.

2. The method of treating liquid hydrocarbon material to form lighter gravity hydrocarbons which comprises heating the material to about 800° F. and under a high enough pressure to prevent vaporization, reducing the pressure to vaporize the major portion of such material in the presence of a protective liquid having a specific gravity less than that of any asphaltic residues, and superheating the vapors formed to about 750° F.

3. The method of treating liquid hydrocarbon material to form lighter gravity hydrocarbons which comprises heating the material in the liquid phase to at least the decomposing temperature of some of its fractions and under a high enough pressure to prevent vaporization, reducing the pressure to vaporize the major portion of such material in the presence of a protective liquid having a specific gravity less than that of any asphaltic residues, forming only a small percentage of the possible light fractions, and knocking back an amount of the heavier vapors equivalent to about three to six times the amount of light fractions collected as pressure distillate.

4. The method of treating liquid hydrocarbon material to form lighter gravity hydrocarbons, which comprises heating the material in the liquid phase to at least the decomposing temperature of some of its fractions and under high enough pressure to prevent vaporization, reducing the pressure sufficiently to simultaneously vaporize a wide range of fractions in the presence of a protective saturated hydrocarbon liquid having a specific gravity less than that of any asphaltic residues, and gently heating a stream of the liquid and vapor mixture to further decompose the vaporized fractions.

5. The method of treating liquid hydrocarbon material to form lighter gravity hydrocarbons, which comprises heating the material in the liquid phase to at least the decomposing temperature of some of its fractions and under a high enough pressure to prevent vaporization, reducing the pressure to vaporize the major portion of such material in the presence of a saturated hydrocarbon liquid having a specific gravity less than that of any asphaltic residues, gently heating the vaporized fractions sufficiently to form only a small part of the possible light fractions, passing the vaporized fractions in heat exchange contact with a preheated liquid hydrocarbon supply, and knocking back an amount of the heavier vapors equivalent to about three to six times the amount of light fractions collected as pressure distillate, by vaporization of the light fractions in the hydrocarbon liquid supply.

6. The method of treating hydrocarbons to form lighter gravity products which comprises raising the temperature of the material to at least the decomposing temperature of some of its fractions under pressure in the liquid phase, lowering the pressure, gradually superheating the products vaporized to about 750° F., separating the vapors evolved, again lowering the pressure and separating the evolved vapors after said second reduction in pressure.

7. The method of treating hydrocarbons to form lighter gravity products, which comprises raising the temperature of the material under pressure in the liquid phase, successively lowering the pressure, separating the vapors evolved after each successive lowering of the pressure, the major portion of the products being vaporized after the first reduction in pressure in the presence of a saturated hydrocarbon liquid mixed with any asphaltic residues, and also being of a composition comprising a wide range of fractions and much less than the possible available pressure distillate.

8. The method of treating hydrocarbons to form lighter gravity products which comprises raising the temperature of the material to at least the decomposing temperature of some of its fractions under pressure in the liquid phase, lowering the pressure, superheating the vapors evolved to 750° F. gradually to form only a small part of the available desired pressure distillate, separating the vapors, again lowering the pressure and separating the evolved vapors.

9. The method of decomposing liquid hydrocarbons which comprises heating a moving stream of said liquid under from 200 to 1,000 pounds pressure at a temperature of about 800° F., reducing the pressure to about 100 to 300 pounds and gently superheating the vaporized material under reduced pressure to a temperature of about 750° F.

10. The method of decomposing liquid hydrocarbons which comprises heating a moving stream of said liquid under from 200 to 1,000 pounds pressure at a temperature of about 800° F., reducing the pressure to about 100 to 300 pounds and gently superheating the moving stream of liquid and vapor under reduced pressure to a temperature of about 750° F. to decompose and form much less than the maximum yield of desired pressure distillate.

11. The process of treating liquid hydrocarbon material to form lighter gravity hydrocarbons which comprises heating said material to at least the decomposing temperature of some of its fractions under a high enough pressure to retain all of it in liquid form, partially reducing the pressure to vaporize and decompose a portion of the material while retaining in liquid form a protective mixture containing a saturated hydrocarbon, passing the mixture of liquid and vapor into a separating container, drawing off the liquid portion from said container, reducing the pressure on said drawn-off liquid while in a moving stream to vaporize the lighter portions thereof, and injecting steam into said stream at the place where its pressure is reduced.

12. The process of treating hydrocarbons which comprises heating the material to be treated to at least the decomposing temperature of some of its fractions under conditions where substantially no decomposition takes place, releasing enough of the heat in said material to decompose a portion thereof in the presence of a protective hydrocarbon liquid adapted to prevent the formation of carbon and having a specific gravity less than that of any asphaltic residues, and subsequently releasing more heat in said material to vaporize the protective liquid.

13. The method of treating liquid hydrocarbons, which comprises passing a stream of material to be treated through a furnace under sufficiently high pressure to avoid any decomposition or vaporization, heating said stream to about 800° F., releasing a portion of the heat of the liquid by partially reducing the pressure sufficiently to vaporize a wide range of products while leaving a saturated hydrocarbon liquid mixed with any asphaltic residues, drawing off the unvaporized mixture, passing the vaporized fractions to a fractioning tower, knocking back and recycling an amount of the heavier vapors equivalent of about four times the amount of pressure distillate.

14. The method of treating liquid hydrocarbon material to form lighter gravity hydrocarbons, which comprises heating the material in a liquid phase to at least the decomposing temperature of some of its fractions and under high enough pressure to prevent vaporization, reducing the pressure sufficiently to simultaneously vaporize a wide range of fractions in the presence of a protective saturated hydrocarbon liquid having a specific gravity less than that of any asphaltic residues, and gently heating the vapors.

15. In an apparatus for the treatment of liquid hydrocarbons, the combination with a pressure container, of a passageway leading therefrom below the liquid level in said container, and a reducing valve in said passageway comprising a valve stem provided with a blunt inner end and externally operable means therefor whereby said valve stem can be forced through said passage, the cross-section of the valve stem at its inner end and the passage being in such ratio that the valve stem cleans the passage of substantially all carbon deposit when forced therethrough.

16. The method of treating liquid hydrocarbon material to form lighter gravity products, which comprises heating the material in the liquid phase to at least the decomposing temperature of some of its fractions and under high enough pressure to prevent vaporization, reducing the pressure sufficiently to simultaneously vaporize the major portion of the material in the presence of a protective hydrocarbon liquid having a specific gravity less than that of any asphaltic residues, and knocking back more than half of the material vaporized.

Signed at New York City, in the county of New York and State of New York this 23d day of October, A. D. 1923.

RICHARD FLEMING.